F. B. PEASE.
FEED MECHANISM FOR APPLE PARING MACHINES.
APPLICATION FILED NOV. 3, 1908.
1,085,628.
Patented Feb. 3, 1914.
3 SHEETS—SHEET 1.
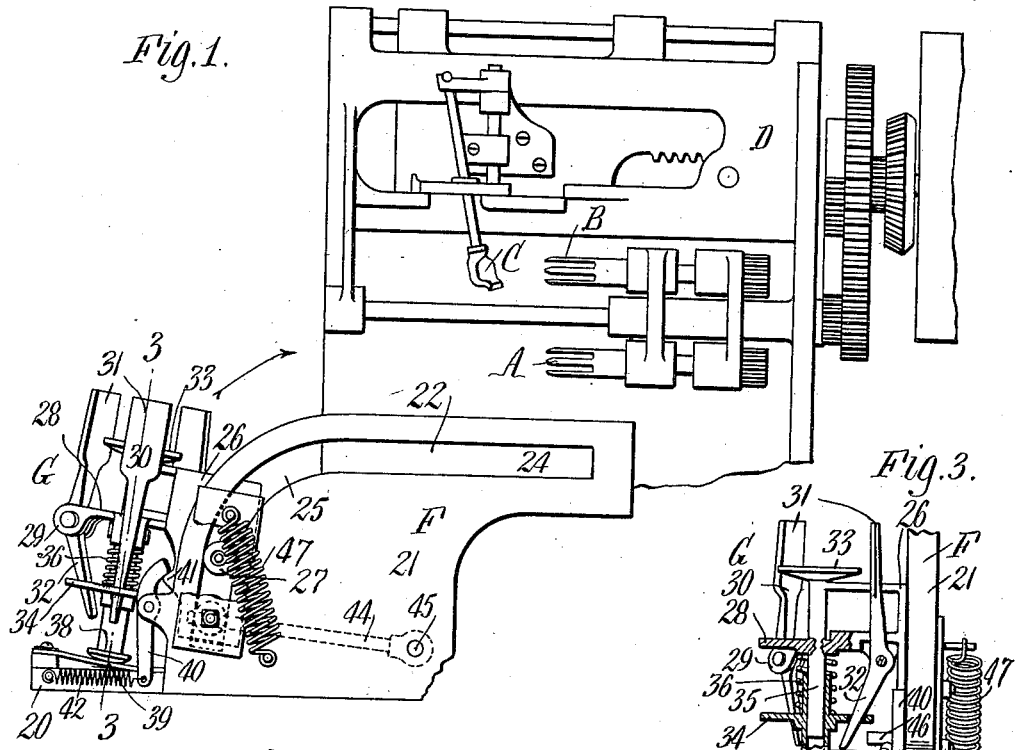
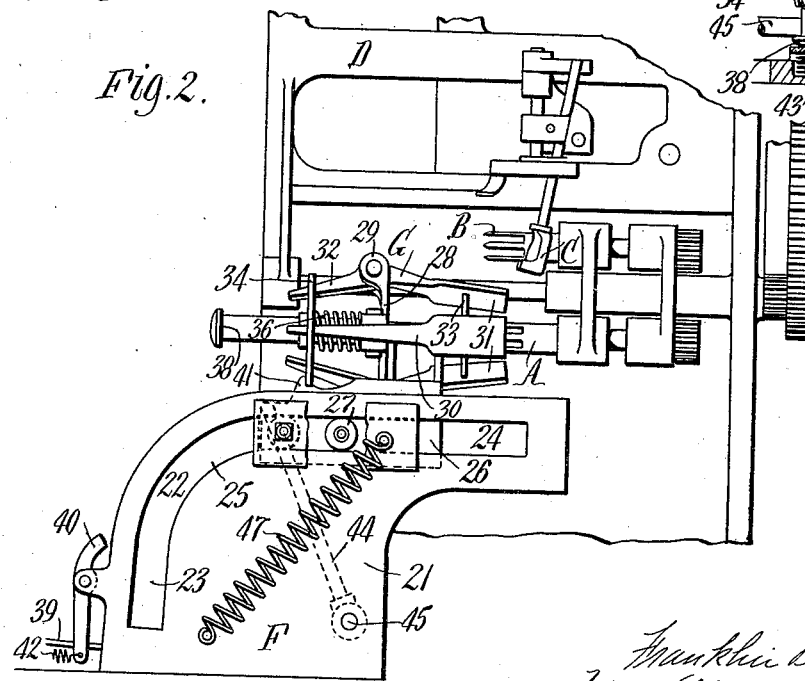
Witnesses:
E. A. Volk
A. S. Dimond
Inventor.
Franklin B. Pease,
by Wilhelm, Parker & Hand,
Attorneys.

F. B. PEASE.
FEED MECHANISM FOR APPLE PARING MACHINES.
APPLICATION FILED NOV. 3, 1908.
1,085,628.
Patented Feb. 3, 1914.
3 SHEETS—SHEET 2.
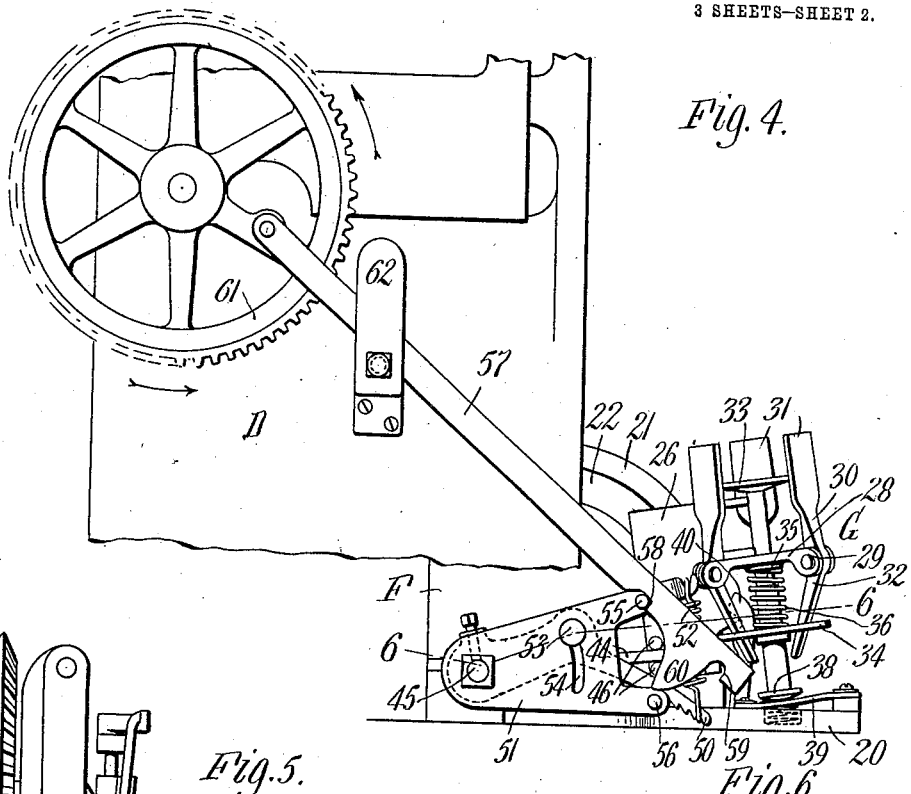
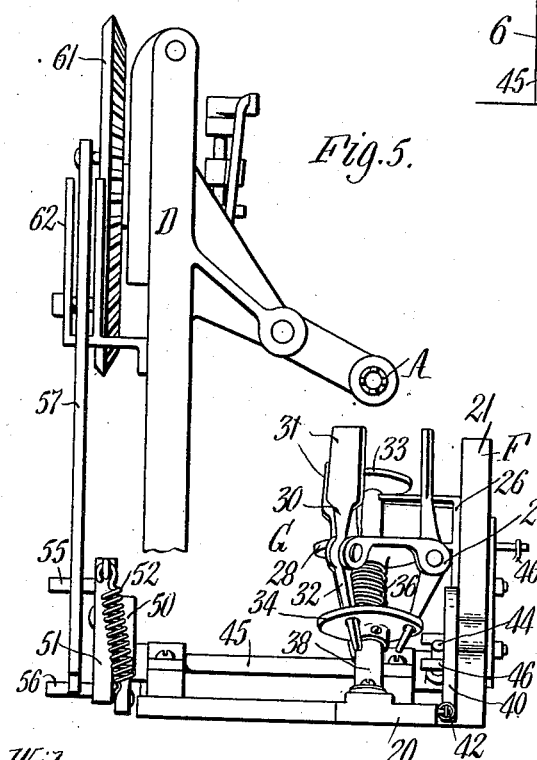
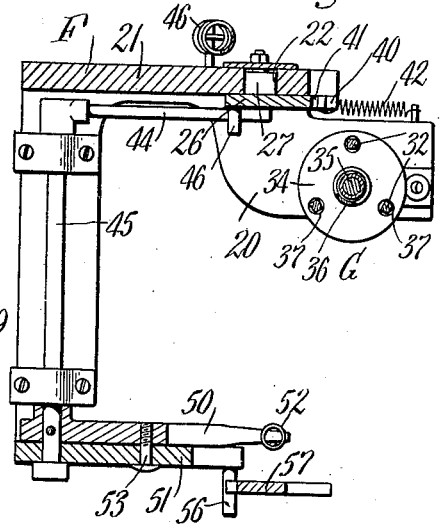
Witnesses:
E. A. Volk
A. G. Dimond
Inventor.
Franklin B. Pease,
by Wilhelm, Parker & Hand,
Attorneys.

F. B. PEASE.
FEED MECHANISM FOR APPLE PARING MACHINES.
APPLICATION FILED NOV. 3, 1908.
1,085,628.
Patented Feb. 3, 1914.
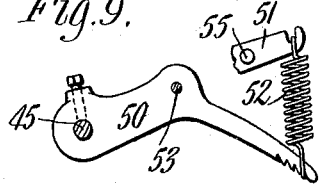
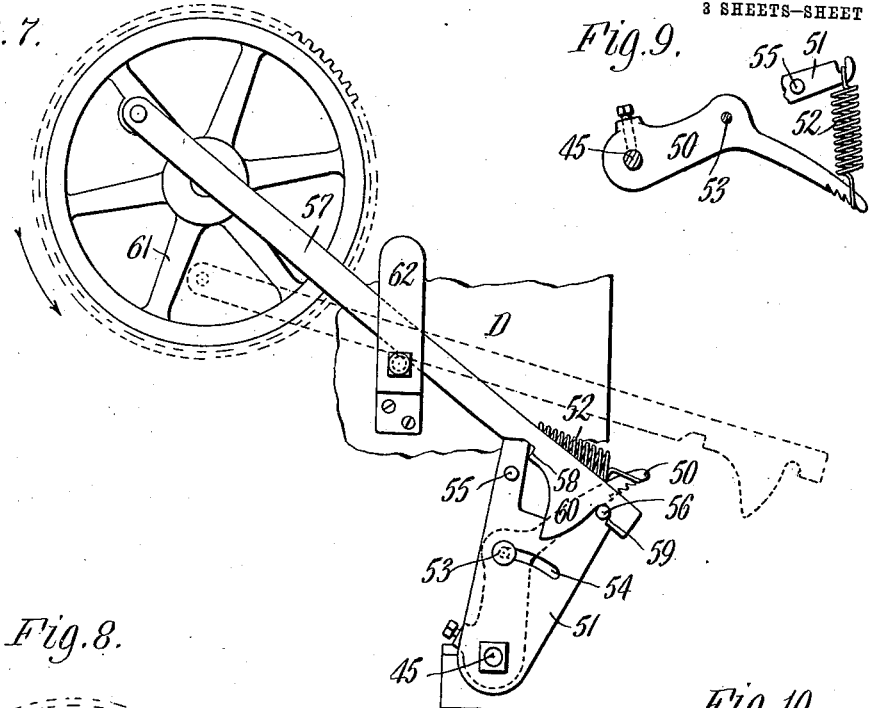
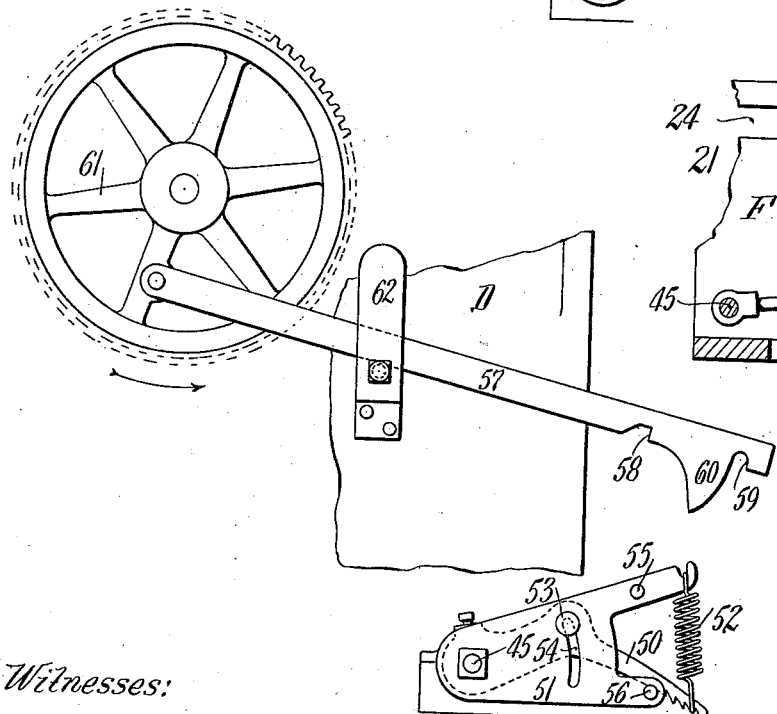
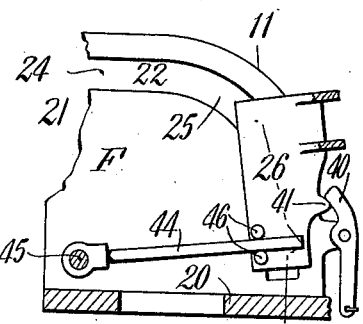
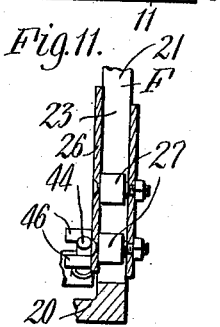

UNITED STATES PATENT OFFICE.

FRANKLIN B. PEASE, OF ROCHESTER, NEW YORK.

FEED MECHANISM FOR APPLE-PARING MACHINES.

1,085,628.             Specification of Letters Patent.        Patented Feb. 3, 1914.

Application filed November 3, 1908. Serial No. 460,830.

*To all whom it may concern:*

Be it known that I, FRANKLIN B. PEASE, a citizen of the United States, residing at Rochester, in the county of Monroe and State of New York, have invented a new and useful Improvement in Feed Mechanism for Apple-Paring Machines, of which the following is a specification.

This invention relates to the feeding mechanism by which apples are placed upon the forks of paring machines. Such machines are usually provided with two or three forks, one of which stands in the receiving position, ready to receive an apple, while another fork, on which an apple has been placed, stands adjacent to the paring knife and is rotated for paring the apple, these forks changing positions at certain intervals. The apples to be pared are placed, one at a time, into the feeding head and carried by the latter to the fork and impaled upon the same.

The objects of the invention are to so construct and organize this feeding mechanism that the feeding head stands in its rest or receiving position with its jaws opening upwardly, so that the apple can be dropped upon the head and between the jaws thereof without requiring any particular attention on the part of the operator, and that the apple is centered and held by the head and then moved forwardly in the proper manner to impale the apple upon the fork; thereby rendering the manual operation required to be performed by the operator very simple, safe and easy and causing the apple to be centered by the mechanism on the fork, whereby waste in paring and coring is avoided; also to provide efficient mechanisms for actuating the jaws of the feeding head and for moving the latter toward and from the fork.

In the accompanying drawings, consisting of three sheets: Figure 1 is a side elevation of the feeding mechanism, viewed from the side at which the feeding head is arranged and showing also adjacent portions of the paring machine, the feeding head being shown in the receiving position. Fig. 2 is a similar view, showing the feeding head in the delivery position. Fig. 3 is a sectional elevation of the feeding head in line 3—3, Fig. 1. Fig. 4 is a side elevation corresponding with Fig. 1 and showing the mechanism viewed from the opposite or driving side. Fig. 5 is a front elevation of the mechanism. Fig. 6 is a horizontal section in line 6—6, Fig. 4. Fig. 7 is a view similar to Fig. 4 but showing the parts in the position in which the actuating rod has nearly completed its effective movement. Fig. 8 is a side elevation of the actuating mechanism, showing the actuating rod released from the rock lever and the latter returned to the rest position. Fig. 9 is a side elevation of the secondary rock lever. Fig. 10 is a side elevation of the rock lever which engages the carriage of the feeding head. Fig. 11 is a vertical section in line 11—11, Fig. 10.

Like reference characters refer to like parts in the several figures.

A and B represent the two forks of a paring mechanism of any suitable construction, the fork A standing in the receiving position, ready to receive an apple, and the fork B standing in the paring position adjacent to the cutter C which operates upon the apple impaled upon the fork B.

D represents the stationary frame of the paring mechanism.

F represents the stationary frame of the feeding mechanism comprising a base plate 20 and an upright side plate 21 having a longitudinal guide slot 22 which comprises an upright front portion 23, a horizontal rear portion 24, and an arc-shaped middle or connecting portion 25.

G represents the feeding head which receives an apple at a time and carries the same upwardly and forwardly to the fork which stands in the receiving position. This movement of the head is controlled by the guide slot 22, in which runs a carriage 26 to which the feeding head is secured and which is provided with wheels or rollers 27 running in this slot. This feeding head comprises a body plate 28 which is rigidly secured to the carriage and provided with ears 29 to which the gripping jaws 30 are pivoted. These jaws project with their gripping portions 31 above this plate and with their tail portions 32 below the same. The feeding head comprises further a rest or supporting disk 33 which is rigidly connected with the body plate 28 and the carriage 26 and which stands at such an elevation with reference to the gripping jaws that an apple resting on this disk will be firmly gripped and held by the upper portions of the jaws which extend above this disk and which move on their pivots inwardly in gripping the apple and outwardly for opening the jaws preparatory to receiving an apple.

The jaws are opened and closed by a follower 34 which is capable of lengthwise movement on a guide pin 35 extending downwardly from the body plate 28. The follower is pressed downwardly by a spring 36 interposed between the follower and the body plate 28. The follower is provided with openings 37 in which the tail pieces 32 of the jaws engage, said tail pieces extending downwardly and inwardly from the pivots so that the movement of the follower along these tail pieces will cause the jaws to rock on their pivots. The follower is provided on its under side with a buffer 38 which strikes upon a stop 39 as the feeding head descends and approaches its rest position, thereby arresting the downward movement of the follower. The carriage and body plate continue their downward movement and this causes the body plate 28 to approach the follower, thereby compressing the spring 36 and swinging the tail portions of the jaws inwardly and the top or gripping portions outwardly, and so opening the jaws, as represented in Figs. 1, 4 and 5. When the carriage has reached the limit of its downward movement and the feeding head its position of rest, Fig. 1, the carriage is engaged by a dog or catch 40 which holds the carriage in this position, with the jaws spread or opened. This dog or catch is pivoted to the stationary side plate 21 and held in engagement with a shoulder 41 on the carriage by a spring 42. This shoulder is oblique so that the carriage is not positively locked in this position but can be moved upwardly by a force sufficient to overcome the resistance of the dog.

The stop 39 is preferably cushioned and may be composed, as shown in Figs. 1 and 3, of a leather strap and an underlying cushion spring 43.

The feeding movement of the carriage and feeding head is effected by a rock arm 44 secured to a transverse rock shaft 45 and engaging between projections or pins 46 on the carriage. The return movement of the carriage and feeding head is effected by a suitable spring, for instance, as shown, a spring 47 which connects the carriage with the lower portion of the side plate 21. As the rock arm 44 swings forwardly in effecting the feeding movement, the carriage first moves upwardly in the upright front portion 23 of the guide slot 22 and then changes the direction of its movement in passing through the arc-shaped portion 25 of the slot, to a horizontal direction and continues in this direction in passing through the horizontal upper or rear portion of the slot.

When the feeding head stands in its rest or receiving position, Figs. 1, 4, 5 and 6, its gripping jaws project upwardly and form with the supporting disk 33, a structure resembling an open basket into which the apple is dropped by the operator. As the feeding head is moved upwardly out of the rest position the movable follower 34 is moved away from the body plate 28 by the spring 36, and this movement of the follower causes the gripping portions of the jaws to be swung inwardly. This inward movement of the jaws centers the apple on the supporting disk and grips the apple firmly. The center line of the feeding head lies in the same vertical plane with that of the fork A which stands in the receiving position, so that by centering the apple in the feeding head it is also centered with reference to the fork. The feeding head now continues its feeding movement and carries the apple to the fork. Before the apple reaches the fork the movement of the feeding head has changed to a horizontal direction and the movement continues in this direction in impaling the apple upon the fork. The extent of this horizontal or rectilinear movement is sufficient to accommodate apples of various lengths and impale the same upon the fork by a movement taking place in the direction of the axis of the fork.

The mechanism by which the rock shaft 45 is actuated is preferably constructed as follows: 50 represents a rock arm which is secured to the rock shaft 45, and 51 is a rock arm mounted loosely on this shaft adjacent to the rock arm 50. These two arms are connected by a spring 52 which holds the same yieldingly in their proper relative position, with a stop pin 53 on the arm 50 resting against the end of a slot 54 in the arm 51, Figs. 4, 7 and 8, which slot limits the movement of one arm with reference to the other. When the arm 51 is swung upwardly out of the position of rest, shown in Fig. 4, the spring 52 causes the arm 50 to take part in this movement, thereby rocking the shaft 45 in the proper direction to effect the feed movement of the feeding head. If the head is stopped before the rock arm 51 has reached the extreme limit of its forward movement this rock arm can continue its movement, while the arm 50 which is connected with the feeding head remains behind, the spring connecting the arms 50 and 51 being strained during this relative movement of the arms. In the operation of the machine the spring is strained in this manner when the apple which is carried by the feeding head reaches the base of the fork before the forward movement of the primary rock arm is completed.

When a short apple is carried by the feeding head there is practically no relative movement between the rock arms 50 and 51 and the two arms operate practically like a single arm. When, however, the apple is longer than the minimum length the secondary arm 50 and the feeding head are arrested when the apple reaches the base of the fork and the primary arm 51 continues the forward movement until the same is completed, the spring permitting the primary arm to so continue its movement, while the secondary arm and the feeding head connected therewith remain stationary.

While the above described means for rendering the feeding head yielding or for cushioning the head is very simple and sensible, it is evident that the means may be varied and a similar yielding or cushioning effect be produced.

The rock arm 51 is provided with two actuating projections or pins 55, 56, arranged one behind the other circumferentially near the free end of the arm. These pins are engaged successively by an actuating rod 57 which is provided with a front shoulder 58 for engaging first the front pin 55, Fig. 4, and with a rear shoulder 59 for engaging afterward the rear pin 56, Fig. 7. Between these shoulders the actuating rod is provided with a depending push claw or projection 60.

The actuating rod receives a compound reciprocating and rocking movement which causes the rod during its effective or forward stroke to engage the primary rock arm 51 and swing the same upwardly, thereby effecting the feeding movement of the feeding head, and to release this rock arm when the feeding movement has been completed, thereby allowing the feeding head to be returned by the return spring 47 to its rest or receiving position. This return movement is effected more quickly than the feeding movement, whereby the period of time during which the feeding head remains in its rest or receiving position is lengthened and the manual operation of supplying an apple to the feeding head is facilitated and rendered more convenient.

The actuating rod 57 is connected at its upper end to a wheel 61 which is rotated from the paring mechanism, so that the feeding mechanism is actuated in unison with the paring mechanism. The rod rests intermediate its ends upon a forked support 62 which is secured to the frame D of the paring mechanism. When the feeding head is in its rest or receiving position the primary rock arm 51 is in its lower position, Fig. 4. At the beginning of the feeding movement the rod engages by its front shoulder 58 the front pin 55 of the rock arm 51 and the upward or forward movement of the rod in the direction of the arrow in Fig. 4 causes the arm 51 to be swung upwardly. This rod then engages by its rear shoulder 59 the rear pin 56 of the rock arm and completes the upward movement of the rock arm and the feeding movement of the feeding head. During this movement the rod slides over the stationary intermediate support 62 but as the upper end of the rod continues its movement with the wheel to which it is connected it is depressed, thereby tilting the rod on the support 62 and raising the free end of the rod so as to disengage the same from the pin of the primary rock arm, Fig. 8, which is in this manner disconnected from the actuating rod when the feeding movement has been completed. The feeding head and the rock shaft and rock arms connected therewith are now quickly returned to the position of rest by the return spring. At the beginning of this return movement the gripping jaws of the feeding head slip from the apple which has been impaled upon the fork, the grip of the jaws upon the apple being not so tight that the jaws require to be opened in order to disengage the head from the apple. As the upper or attached end of the rod continues its movement with the wheel the free end of the rod is at first further raised, as shown in dotted lines in Fig. 7, and then lowered until it again reaches the position which it occupies at the beginning of the feed movement, in which position the free end of the rod rests upon and engages the front pin 55 of the primary rock arm, as represented in Fig. 4.

The push claw 60 on the actuating rod serves to push the primary rock lever backwardly and to start the return movement of the feeding head, if the latter should be accidentally bound in the position which the parts occupy at the end of the feed movement when the apple has been impaled upon the fork.

The feeding movement gathers speed during the first part of the movement, as the upper end of the actuating rod travels toward the position of greatest speed, and then becomes slower as the rod approaches the end of the feed movement during which the apple is impaled upon the fork.

I claim as my invention:

1. The combination with the fork of a paring machine, of a feeding head provided with fruit holding means, said head being arranged to move from a fruit receiving position in which it stands with the open end of its fruit holding means uppermost, to a position in which it moves parallel with the fork for inserting the fruit thereon, and means for moving said head from its fruit receiving position to its fruit feeding position, substantially as set forth.

2. The combination with the fork of a paring machine, of a feeding head provided with fruit holding means, said head being arranged to move in a continuous path from a fruit receiving position in which it stands with the open end of its fruit holding means uppermost to a position in which it presents the open end of its fruit holding means to the fork and moves in a direction parallel with the fork for inserting the fruit thereon, and means for moving said head from its fruit receiving position to its feeding position, substantially as set forth.

3. The combination with the fork of a paring machine, of a feeding head having fruit holding means, mechanism by which said head is moved toward and from the fork, and guiding means for said head causing said head to stand in its receiving position with the open end of the fruit holding means uppermost and to be turned until said open end faces the fork and then moved in a direction substantially parallel to the axis of the fork for impaling the fruit thereon, substantially as set forth.

4. The combination with the fork of a paring machine, of a feeding head, a rock arm by which the head is moved toward and from the fork, and a stationary guide for said head comprising an upright front portion, a horizontal rear portion and a curved connecting portion, substantially as set forth.

5. The combination with the fork of a paring machine, of a feeding head provided with gripping jaws which are pivoted to the head, a movable follower engaging said jaws for opening and closing the same and provided with a buffer by which the return movement of the head is arrested, and a spring interposed between the head and the follower, substantially as set forth.

6. The combination with a feeding head provided with gripping jaws, of yielding means tending to close said jaws, a follower adapted to open said jaws, a stop which engages said follower when said head is in its receiving position to stop the movement of said head and to open said jaws, and means for yieldingly retaining said head in its receiving position whereby said jaws are held in their open position, substantially as set forth.

7. The combination with the feeding head provided with gripping jaws, of a movable follower engaging said jaws, a spring acting upon said follower and tending to close said jaws, a stop which engages said follower when said head is moved to its receiving position and moves said follower against the action of said spring to open said jaws, and a spring catch engaging said head in its receiving position and which yieldingly holds the head in its receiving position against the action of the spring on said follower to retain the jaws in their open position, substantially as set forth.

8. The combination with the feeding head provided with gripping jaws, of a follower arranged on the under side of said head and engaging said jaws for opening and closing the same, a buffer arranged on the under side of the follower, a stop which arrests said buffer as the head approaches its receiving position, and a catch which engages and holds said head in such position, substantially as set forth.

9. The combination with the fork of a paring machine, of a feeding head having fruit holding means, an actuating mechanism for said head comprising two members which are movable with reference to each other and are yieldingly connected, one of said members being connected with the head and the other with the driving mechanism for feeding the fruit to the fork, substantially as set forth.

10. The combination with the fork of a paring machine, of a feeding head having fruit holding means, an actuating mechanism for said head comprising a rock shaft, a rock arm secured to the same and connected with said head, a secondary rock arm secured to said shaft, a primary rock arm loosely mounted on said shaft, a yielding connection between said primary and secondary arms, and means for actuating said primary rock arm to move said head into position for feeding the fruit to the fork, substantially as set forth.

11. The combination with a feeding device which is movable back and forth between a receiving and a feeding position, of an actuating rod which is adapted to engage said feeding device for moving the same from its receiving to its feeding position, means for returning said head to its fruit receiving position, means for moving said actuating rod out of engagement with said feeding device to permit said feeding device to be returned to its receiving position, and means on said rod for actuating the feeding device to begin the return movement thereof, substantially as set forth.

12. The combination with the fork of a paring machine, of a feeding head having fruit holding means and movable from a fruit receiving position into position to feed the fruit to the fork, driving means for said head and connections between said driving means and said head which operate to move said head into its fruit feeding position, means for returning said head to its fruit receiving position, means for disconnecting said head from said driving means during its return movement, and means for actuating said feeding head to begin the return movement of the feeding head, substantially as set forth.

13. The combination with the feeding head, of an actuating mechanism comprising a rocking member which is connected with said head and actuates the same in the feeding direction, an actuating rod which is adapted to engage with its free end said rocking member, a wheel with which said rod is connected at its opposite end, and an intermediate support upon which said rod is rocked to move it into and out of engagement with said rocking member, substantially as set forth.

14. The combination with the feeding head, a rock shaft, a rock arm connecting said head to said shaft, and a rocking member by which said shaft is actuated and which is provided with a plurality of actuating projections, of an actuating rod provided with shoulders which engage said projections successively, and means for engaging said rod with said projections and disengaging said rod therefrom, substantially as set forth.

15. The combination with the feeding head and a rocking member by which it is actuated and which is provided with a plurality of actuating projections, of an actuating rod provided with shoulders which engage said projections successively and with a depending claw between said shoulders, and means for engaging said rod with said projections and disengaging said rod therefrom, substantially as set forth.

Witness my hand in the presence of two subscribing witnesses.

FRANKLIN B. PEASE.

Witnesses:
EDWARD WILHELM,
CYESTA B. HORNBECK.

Copies of this patent may be obtained for five cents each, by addressing the "Commissioner of Patents, Washington, D. C."